United States Patent
Murkute et al.

(10) Patent No.: US 11,967,729 B2
(45) Date of Patent: Apr. 23, 2024

(54) WALL-MOUNT SUPPORT

(71) Applicant: Rivian IP Holdings, LLP, Irvine, CA (US)

(72) Inventors: Akshay Kishor Murkute, Irvine, CA (US); Khaled Bahei-Eldin, Irvine, CA (US)

(73) Assignee: Rivian IP Holdings, LLP, Irvine, CA (US)

( * ) Notice: Subject to any disclaimer, the term of this patent is extended or adjusted under 35 U.S.C. 154(b) by 0 days.

(21) Appl. No.: 17/866,120

(22) Filed: Jul. 15, 2022

(65) Prior Publication Data

US 2024/0021945 A1  Jan. 18, 2024

(51) Int. Cl.
  *F16M 13/02* (2006.01)
  *H01M 50/251* (2021.01)
  *H01M 50/262* (2021.01)

(52) U.S. Cl.
  CPC .......... *H01M 50/251* (2021.01); *F16M 13/02* (2013.01); *H01M 50/262* (2021.01); *H01M 2220/10* (2013.01)

(58) Field of Classification Search
  CPC ............ H01M 50/251; H01M 50/262; H01M 2220/10; F16M 13/02
  USPC ...................................................... 248/309.1
  See application file for complete search history.

(56) References Cited

U.S. PATENT DOCUMENTS

| | | | | |
|---|---|---|---|---|
| 5,796,585 A | * | 8/1998 | Sugiyama | H05K 7/1435 361/740 |
| 8,605,434 B2 | * | 12/2013 | Chao | H05K 5/0204 361/752 |
| 2009/0173855 A1 | * | 7/2009 | Worrall | F16M 11/10 248/220.21 |
| 2009/0206214 A1 | * | 8/2009 | David | F16M 13/02 248/205.1 |
| 2019/0376320 A1 | * | 12/2019 | Cheung | F16M 11/22 |

OTHER PUBLICATIONS

"Discover Wall Mount Bracket for 6.5kWhr 42-Series AES LiFePO4 Battery", Wind and Sun, retrieved from https://web.archive.org/web/20201028083450/https://www.solar-electric.com/discover-wall-mount-battery-bracket-42-series.html, Oct. 28, 2020, 2 pages.

\* cited by examiner

*Primary Examiner* — Bradley Duckworth
(74) *Attorney, Agent, or Firm* — Haley Guiliano LLP (57) ABSTRACT

Illustrative examples of an apparatus may be directed to a mounting apparatus for a device. The apparatus may include a support comprising a plurality of mounting apertures aligned on a mounting plane. The support may be configured to be mounted to a wall member such that the mounting plane is parallel and adjacent to the wall member. The support may also include a load bearing feature extending away from the mounting plane to support the device. The support may further include a blind guide configured to guide a device tab extending downward into a receiving space defined by the blind guide.

17 Claims, 7 Drawing Sheets

WALL-MOUNT SUPPORT

INTRODUCTION

The present disclosure is directed to an apparatus for supporting a device on a wall structure, and more particularly to an apparatus for supporting a device on a wall structure that facilitates a safe and secure installation of large and/or heavy devices.

SUMMARY

Residential energy storage systems may store electrical energy in a collection of battery cells or packs. To the extent a residential energy storage system has energy storage capabilities typical for household energy needs, the battery packs may be relatively heavy. The heavy weight of such residential energy storage systems can make installation to wall structures difficult. For example, if these residential energy storage products are not mounted accurately and securely on wall structures, they may become misaligned or even fall off during installation or subsequently, e.g., due to seismic events. There is also a desire to standardize wall mounting solutions for energy storage and charging systems.

Accordingly, in at least some example illustrations a mounting apparatus for a device includes a support comprising a plurality of mounting apertures aligned on a mounting plane. The support is configured to be mounted to a wall member such that the mounting plane is parallel and adjacent to the wall member. The support includes a load bearing feature extending away from the mounting plane to support the device. The support further includes a blind guide configured to guide a device tab extending downward into a receiving space defined by the blind guide.

In at least some examples, the load bearing feature is vertically spaced away from the blind guide when the support is mounted to the wall member.

In at least some example approaches, the load bearing surface is configured to provide vertical support to a first portion of the device and limit horizontal movement of the first portion of the device away from the wall, with the blind guide being positioned vertically above the load bearing surface and being arranged to limit horizontal movement of a second portion of the device away from the wall.

In at least some example illustrations, the load bearing feature extends in a bearing surface plane perpendicular to the mounting plane.

In at least some example approaches, the blind guide includes two guide tabs positioned at opposite ends of the receiving space. The receiving space may, in some of these examples, be delimited at the opposite ends by the two guide tabs such that the guide tabs prevent insertion of the device tab into the receiving space unless the device tab is aligned between the two guide tabs.

In at least some examples, the apparatus further includes a lock member received by the support, such that withdrawal of the device tab from the receiving space may be prevented. In at least a subset of these approaches, the lock member is inserted through a lock flange of the support and a device flange.

In at least some example approaches, a bracket for mounting a device to a wall is provided. The bracket may include a support structure arranged to provide vertical support to a first portion of the device, and to limit horizontal movement of the first portion of the device away from the wall. The bracket may further include a restraining structure positioned vertically above the support structure and arranged to limit horizontal movement of a second portion of the device away from the wall.

In at least some examples, the restraining structure includes two guide tabs positioned at opposite ends of a receiving space for a downwardly extending device tab.

In at least some example illustrations, the receiving space is delimited at the opposite ends by the two guide tabs such that the guide tabs prevent insertion of the device tab into the receiving space unless the device tab is aligned between the two guide tabs.

In at least some example approaches, the bracket further includes a lock member received by the support, such that withdrawal of the device tab from the receiving space may be prevented. In at least a subset of these approaches, the lock member is inserted through a lock flange of the support and a device flange.

In at least some examples, the restraining device is a blind guide configured to guide a device tab extending downward into a receiving space defined by the blind guide.

In at least some example illustrations, the support structure includes a plurality of mounting apertures aligned on a mounting plane, wherein the support is configured to be mounted to a wall member such that the mounting plane is parallel and adjacent to the wall member.

In at least some example approaches, the support structure includes a load bearing surface configured to provide the vertical support to the first portion of the device and limit horizontal movement of the first portion of the device away from the wall.

In at least some example approaches, a method of mounting a device includes mounting a support to a wall member with a plurality of mounting apertures aligned on a mounting plane such that the mounting plane is parallel and adjacent to the wall member. The method further includes hanging the device on a load bearing feature of the support. The load bearing feature extends away from the mounting plane. A blind guide of the support aligns a device tab extending downward into a receiving space defined by the blind guide.

In at least some example methods, the receiving space is delimited at the opposite ends by two guide tabs such that the guide tabs prevent insertion of the device tab into the receiving space unless the device tab is aligned between the two guide tabs.

In at least some example approaches, the method further includes inserting a lock member into the support, such that withdrawal of the device tab from the receiving space may be prevented. In at least a subset of these approaches, the lock member is inserted through a lock flange of the support and a device flange.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Example illustrations are generally directed to a support, such as a wall-mount bracket, which will provide ease of installation and a safe working environment for installers to install a device on a wall member. In at least some examples, the support is a wall-mount bracket. As used herein, a bracket is a support configured to be affixed to a wall member, and which has a portion or feature extending away from the wall member to support a device. Devices that may be supported on the support may include residential battery systems or charging devices, merely as examples. In at least some examples, a support generally may provide vertical support to a first portion of the device. The support may also limit horizontal movement of the first portion of the device away from the wall. The support may have a restraining structure positioned vertically above the support structure and arranged to limit horizontal movement of a second portion of the device away from the wall. In at least some examples, the support includes a load bearing surface that provides vertical support to the first portion of the device and limits horizontal movement of the device. The restraining structure of the support may be, in some examples, a "blind guide" that facilitates secure mounting of residential products to the wall member. More specifically, as will be discussed further below, the blind guide may facilitate installation of relatively large devices, e.g., larger than the bracket/support, to a wall structure without visually confirming alignment of the device with the bracket/support.

Figure 1:
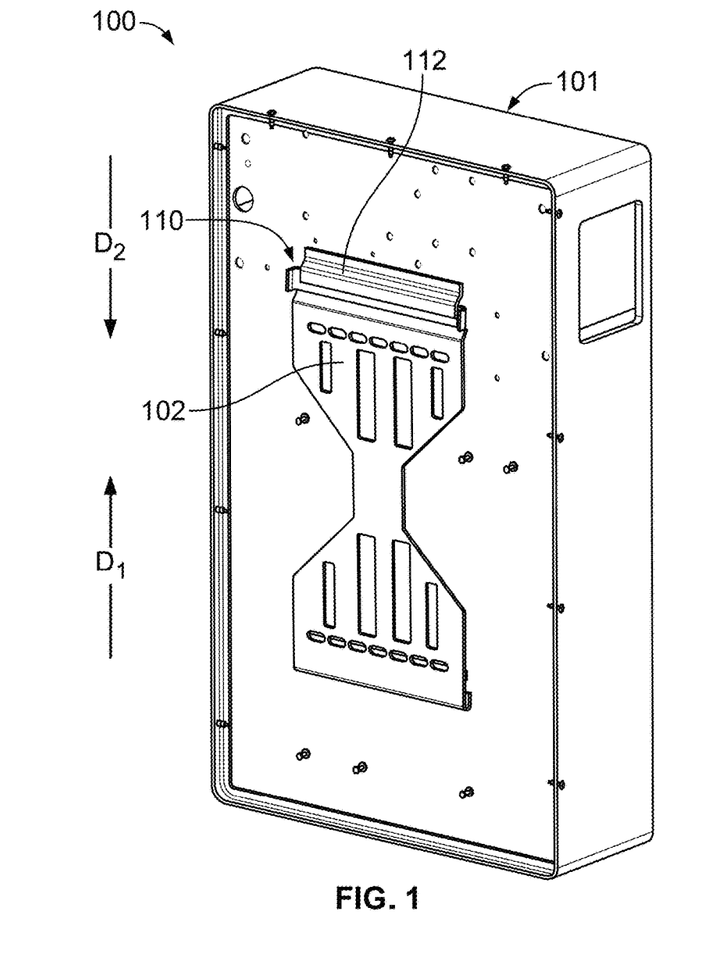
FIG. 1 shows a perspective view of a device mounted on a bracket or apparatus for supporting the device on a wall member, in accordance with some embodiments of the present disclosure.
Figure 2:
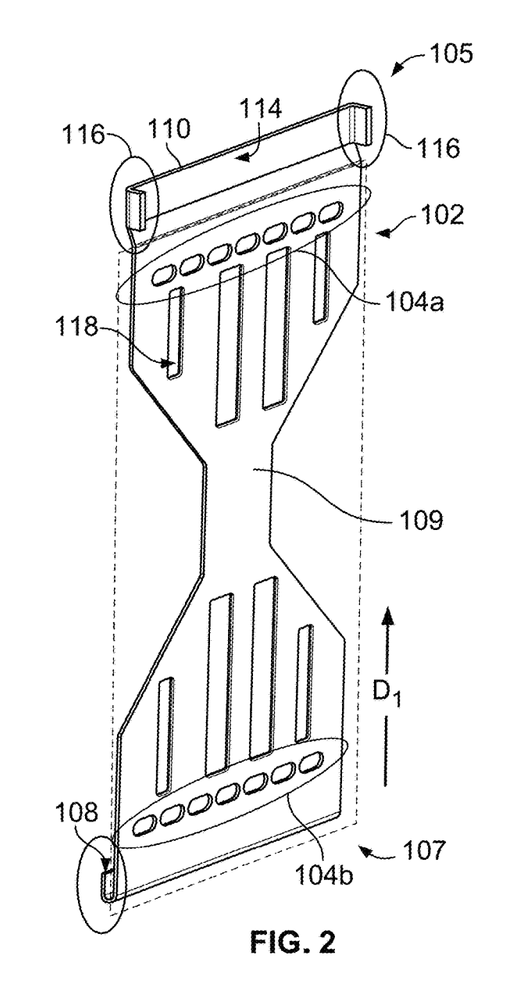
FIG. 2 shows a perspective view of the bracket/apparatus of FIG. 1, in accordance with some examples.

Turning now to FIGS. 1 and 2, an example system 100 for mounting devices on a wall structure is illustrated and described in further detail. FIG. 1 includes an example device 101, which in the illustrated example is a residential energy storage system, which may be positioned upon a mounting apparatus or support 102 configured to be mounted upon a wall structure or the like. As will be discussed further below, the support 102 is configured to be secured to a wall member, and has one or more features extending away from the wall member to support the device 101 on the wall member. In at least some example, the features extending away from the wall member include a load bearing feature or surface, as well as a restraining feature or guide. In some applications, stationary electrical power storage systems facilitate deployment of alternative energy by allowing temporary storage of power generated by solar cells or panels, merely as one example.

The residential energy storage system 101 may include a one or more battery packs (not shown) configured to store electrical energy. Example battery packs may have a plurality of, and in some cases a large number of, battery cells. The battery cells (not shown) are configured to store electrical energy, e.g., received from a power grid, and to provide electrical power from the battery cells on demand, e.g., while the power grid is unavailable, experiencing an outage, etc. Example battery cells may include, but are not limited to, lithium-based battery cells such as lithium-ion ("Li-ion"), Lithium-Nickel-Manganese-Cobalt-Oxide ("NMC"), or Lithium Nickel-Cobalt-Aluminum Oxide ("NCA") cells. In one example approach, a battery pack includes 864 2170-type cylindrical lithium-ion cells. Battery cells may be electrically connected or tied together in any manner that is convenient and may be arranged in a specific series-parallel combination to optimize energy density. Further, battery cells within a pack may be grouped into modules or submodules within the battery pack. An insulating material, e.g., mica, may be provided around a battery module or cells to inhibit or prevent burn-through of internal components adjacent the module/cells. In an example, the mica sheets are positioned such that they are spaced above and in between sub-modules. In an example, the maximum energy throughput of the device 101 is 15.55 kilowatt hours (kWh), with a relatively reduced usable energy of 13.2 kWh to increase operational life of the device 101.

As noted above, the support 102 is configured to support the device 101 upon, for example, a wall structure (not shown in FIGS. 1 and 2). For example, the support 102 may be mounted to studs or other structural members of a wall. To the extent the device 101 is relatively heavy, it may be desirable to mount the support 102 to relatively strong or secure wall member(s). The support 102 may be formed of any material that is convenient. In some example approaches, the support 102 is formed of a stamped metallic material, e.g., steel. For example, the support 102 may be formed of a cold-rolled steel having a 2.0 millimeter (mm) thickness. As will be described further below, the support 102 is configured to provide vertical support to the device 101 to maintain the device 101 in a stable position on the wall structure/member(s).

The support 102 includes an upper portion 105 and a lower portion 107, with each defining one or more mounting apertures 104 to facilitate securing the upper portion 105 and lower portion 107, respectively, to a wall structure, e.g., via a threaded fastener, bolt, or the like. A narrowed portion 109 extends between the upper portion 105 and the lower portion 107. In the example illustrated in FIGS. 1 and 2, mounting apertures 104 are arranged in an upper plurality of apertures 104a and a lower plurality of apertures 104b (collectively, 104). The upper portion 105 and lower portion 107 may each have mounting apertures 104 that are spaced apart laterally, thereby providing multiple mounting positions for fastener(s) to secure the upper portion 105 and lower portion 107 of the support 102 to a wall structure. Threaded fasteners, e.g., M8 fasteners, may be inserted through apertures 104 and threaded into a wall member, e.g., wall studs, to secure the support 102. The apertures 104 may provide for installation of threaded fasteners into multiple wall members having a standard spacing, e.g., wall studs spaced 16 inches apart, or the like. Further, a slotted/elongated shape of the mounting apertures as illustrated may allow positional flexibility of the support 102 on the wall member, e.g., to allow slight shifting of the support 102 to a desired installed position.

The support 102 generally extends in a mounting plane 106. The support 102 may typically be secured to a wall member or surface such that the mounting plane 106 extends parallel and/or in contact with the wall member, as will be described further below. The mounting apertures 104 may be aligned parallel to the mounting plane 106 or may extend in the mounting plane 106. The support 102 may define one or more stiffening features 118. As illustrated, the stiffening features 118 may be ribs or other undulations configured to stiffen the support 102 such that it resists bending, particularly with respect to the mounting plane 106. In an example, the ribs 118 are elongated vertically with respect to the support 102. The ribs 118 may be formed in any manner that is convenient, e.g., by stamping into a sheet from which the support 102 is formed. The support 102 may also have a load bearing feature 108 configured to support device 101. The load bearing feature 108 may extend away from the mounting plane 106 and/or the wall member.

The support 102, as illustrated in FIGS. 1 and 2 and noted above, generally includes an upper portion 105 and a lower portion 107 that are joined by the narrowed portion 109 in a single monolithic piece. Alternatively, the upper portion 105 and lower portion 107 may be provided separately. The provision of the support 102 as a single monolithic piece, however, may further simplify an assembly and/or manufacturing process and also may ensure efficient mounting points for the support 102. For example, the narrowed portion 109 generally fixes a relative position of the upper portion 105 and lower portion 107 and features thereof, e.g., mounting apertures 104a/104b, blind guide 110 and load bearing feature 108, etc. Accordingly, a position of the blind guide 110 relative to the load bearing feature 108 is generally fixed. Providing the upper portion 105 and lower portion 107 as separate parts (i.e., without a feature joining the upper portion 105 and lower portion 107, e.g., narrowed portion 109) may save additional overall weight, but may also require an additional alignment of the upper portion 105 to the lower portion 107 during installation.

Figure 3:
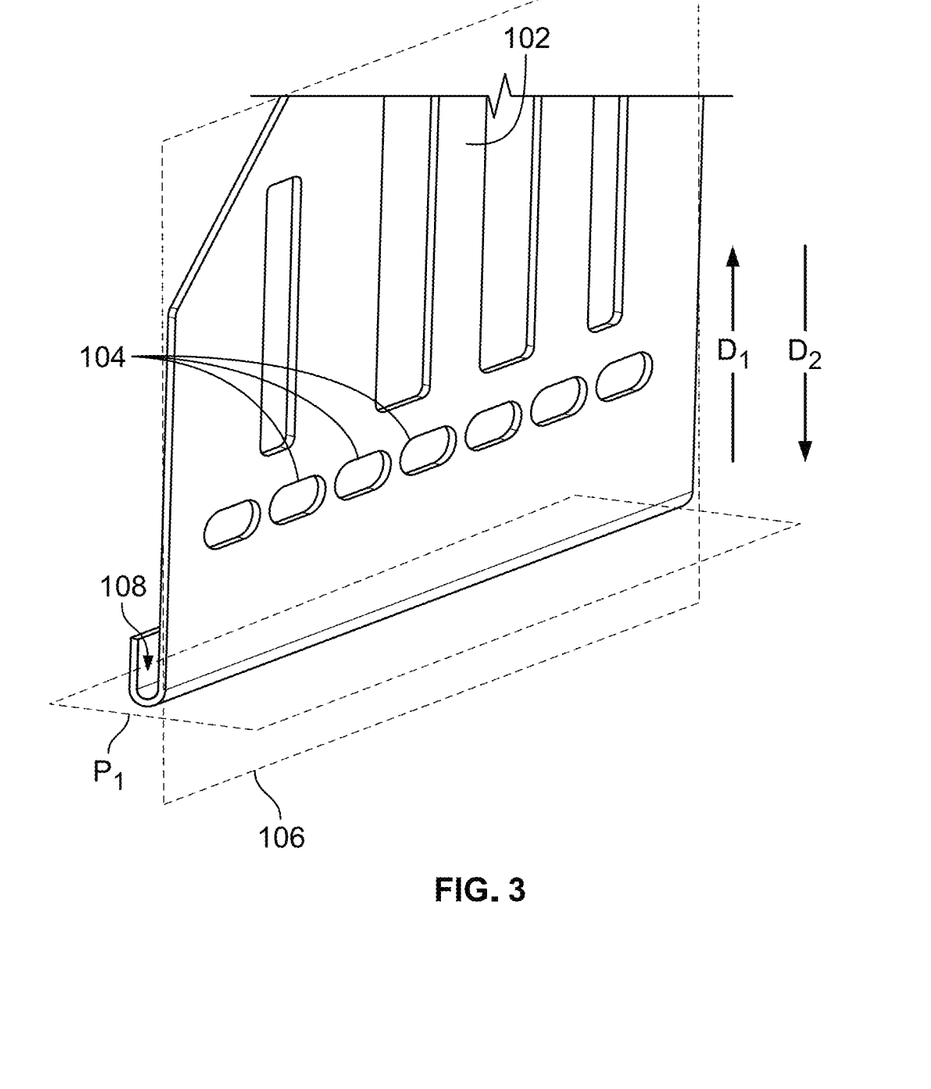
FIG. 3 shows an enlarged view of a lower end of the apparatus of FIG. 2, in accordance with an example.

Turning now to FIG. 3, which is an enlarged view of a lower end of the support 102, the load bearing feature 108 of the support is illustrated and described in further detail. In the example illustrated, the support 102 extends to the lower portion 107 and is stamped or otherwise formed with a turned end defining the load bearing feature 108. The load bearing feature 108 may be any configuration that is convenient. For example, the load bearing feature 108 may be curved as illustrated or may have a planar portion. The load bearing feature 108 may define a surface extending away from the mounting plane 106 of the support 102. As noted above, in some examples the support 102 is a bracket configured to be secured to a wall member, with a feature extending away from the wall member to support a device, such as the load bearing feature 108. The load bearing feature 108, in the illustrated example, extends across an entire width of the support 102, i.e., parallel to the mounting plane 106, as a single continuous surface. However, it should be understood that the load bearing feature 108 may be separated into multiple portions. Moreover, the load bearing feature 108 need not be provided at the lower portion 107 or even positioned at a lower end of the support 102, and may be positioned at any location on the support 102 that is convenient.

Figure 5:
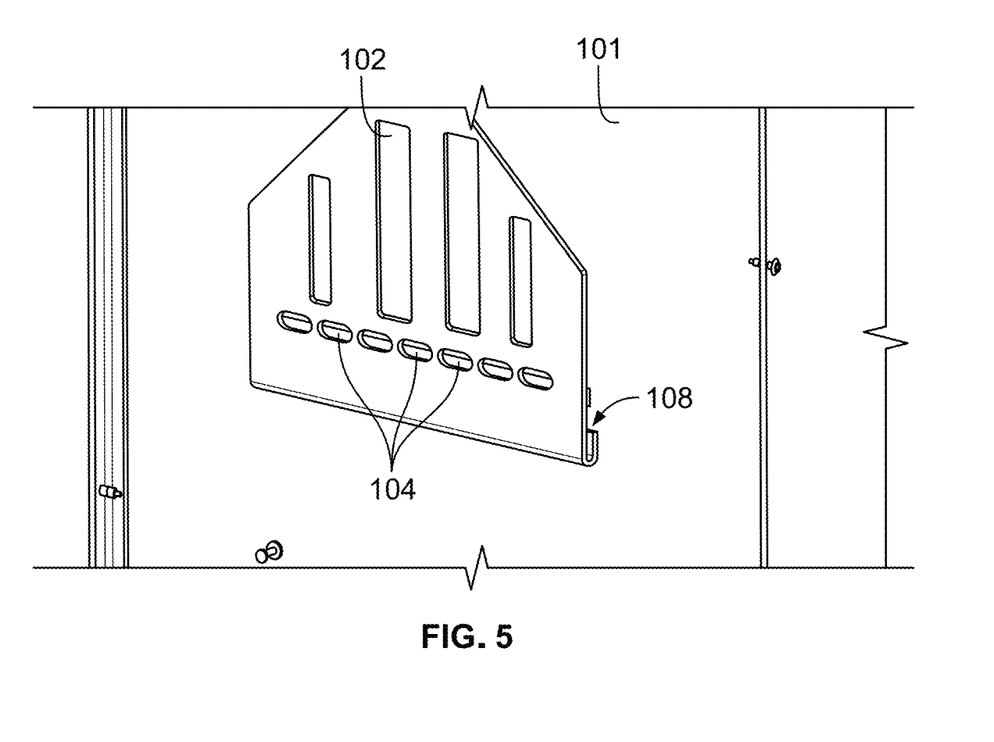
FIG. 5 shows an enlarged view of a lower end of the apparatus of FIGS. 1 and 2, showing the device mounted on the apparatus, in accordance with an example approach.

Generally, the load bearing feature 108 is provided as a surface configured to support a load placed upon the support 102. In the illustrated example, the load bearing feature/surface 108 generally faces a direction $D_1$ that is parallel to the mounting plane 106. Accordingly, as best seen in FIG. 5, a device 101 or other load may be positioned upon the load bearing feature 108. Put another way, at least a portion of the load bearing feature 108 defines a bearing surface plane $P_1$ facing the direction $D_1$ (see FIG. 3). The load bearing feature 108 thus extends away from the mounting plane 106 to support the device 101.

Referring again to FIG. 1, the support 102 may also include additional features extending away from the mounting plane 106 to support device 101. For example, the support may include a restraining feature or a blind guide 110. In the example illustrated, the blind guide 110 is configured to align or guide a load being positioned upon the support 102, e.g., device 101, to a stable position on the support 102. In the example illustrated, the blind guide 110 is at an upper end of the support 102, and generally defines a receiving space 114. The receiving space 114 is configured to receive a corresponding feature of a load or device being supported by the support and to align the feature and/or the device.

Figure 4:
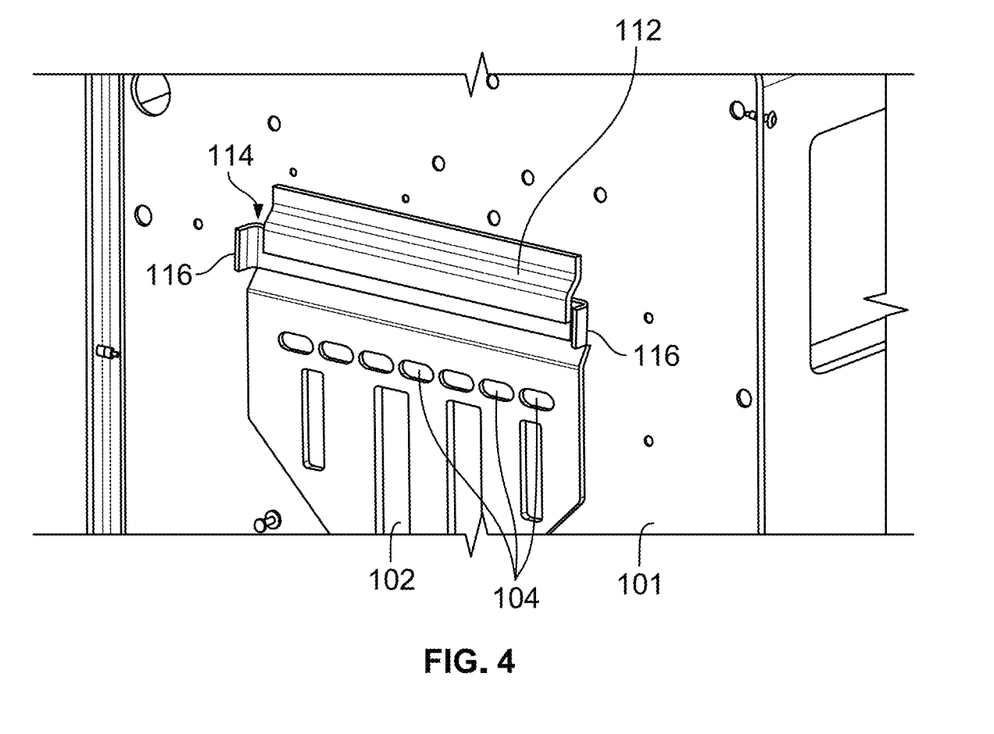
FIG. 4 shows an enlarged view of an upper end of the apparatus of FIGS. 1 and 2, showing the device mounted on the apparatus, in accordance with an example approach.

For example, as illustrated in FIGS. 2 and 4, a device tab 112 fixed to the device 101 may be received in the receiving space 114 when the device 101 is positioned on the support 102. The device tab 112 may extend downwardly from the device 101 with respect to the support, i.e., in a direction $D_2$ that is opposite the facing direction $D_1$ of the load bearing feature 108. The blind guide 110 may serve as a restraining feature of the support 102 with respect to the device 101 in a horizontal direction or in a direction perpendicular to mounting plane 106. More specifically, with the device 101 positioned on the load bearing feature 108, device tab 112 may be stably held within the receiving space 114.

The blind guide 110 includes two guide tabs 116 positioned on opposite sides of the receiving space 114. The support 102 may extend out of the mounting plane 106 to define the receiving space 114. Further, the guide tabs 116 may generally delimit the receiving space 114 at their respective opposite ends. Accordingly, as best seen in FIG. 4, the two guide tabs 116 may prevent insertion of the device tab 112 into the receiving space 114 during installation of the device 101, unless the device tab 112 is aligned between the two guide tabs 116. More specifically, as illustrated the device tab 112 defines a width equal to that of the receiving space 114 or substantially so, such that the device tab 112 may only be inserted into the receiving space 114 when the device tab 112 is aligned with the receiving space 114. Accordingly, as will be described further below, the device tab 112 may be guided into the receiving space 114 during mounting or installation of device 101 to the support. Moreover, as will also be elaborated below the guidance of the device tab 112 into the receiving space 114 may be done without a user/installer visually confirming alignment of the device tab 112 and/or support 102.

While the examples herein generally illustrate a device tab 112 that is carried by the device 101 and inserted into the receiving space 114, it should be noted that an opposite arrangement is possible, i.e., a tab may be defined by the support 102 and inserted into a receiving space of a feature carried by the device 101.

It should be noted that the blind guide 110 may bear some portion of a load placed upon the support 102 by device 101 when the device 101 is installed to the support 102. Generally, in the example illustrated the load bearing feature 108 supports a large portion of an overall load of the device 101, with a significantly smaller portion of the weight of the device 101 bearing upon the upper portion of the support 102, e.g., at the blind guide 110. Further, in some examples the load bearing feature 108 provides primary vertical support for the device 101, with the blind guide 110 being a restraining feature that prevents horizontal movement of the device 101. In these examples, the blind guide 110 need not bear significant vertical weight of the device 101.

As best seen in FIGS. 1 and 2, the load bearing feature 108 is vertically spaced from the blind guide 110. In the example illustrated, the load bearing feature 108 is positioned at the lower end of the support, while the blind guide 110 is positioned along an upper or uppermost portion of the support 102. As will be seen below regarding installation of device 101 to the support 102, the vertical space between the load bearing feature 108 and the blind guide 110 may facilitate positioning of the device 101 immediately and directly above the load bearing feature 108 when the device tab 112 is initially inserted into the receiving space 114 of the blind guide 110, thereby facilitating accurate positioning of the device 101 on the load bearing feature 108.

The support 102 may be configured to facilitate management of heat or thermal output of devices mounted to the support 102, e.g., device 101. For example, the support 102 may allow the device 101 to be mounted in such manner that the device is spaced from a wall structure or surface to which the support 102 is mounted. The load bearing feature 108, extending in a direction parallel to direction $D_1$ as noted above (see FIG. 3), may thereby position the device 101 away from the wall structure/surface, at least where the device 101 contacts the load bearing feature 108. The restraining feature or blind guide 110 may also allow the device 101 to "lean" slightly away from the wall structure/surface. Accordingly, space behind the device 101 with respect to the wall structure or surface may facilitate venting, or otherwise reduce restrictions in airflow around the device 101.

Figure 6A:
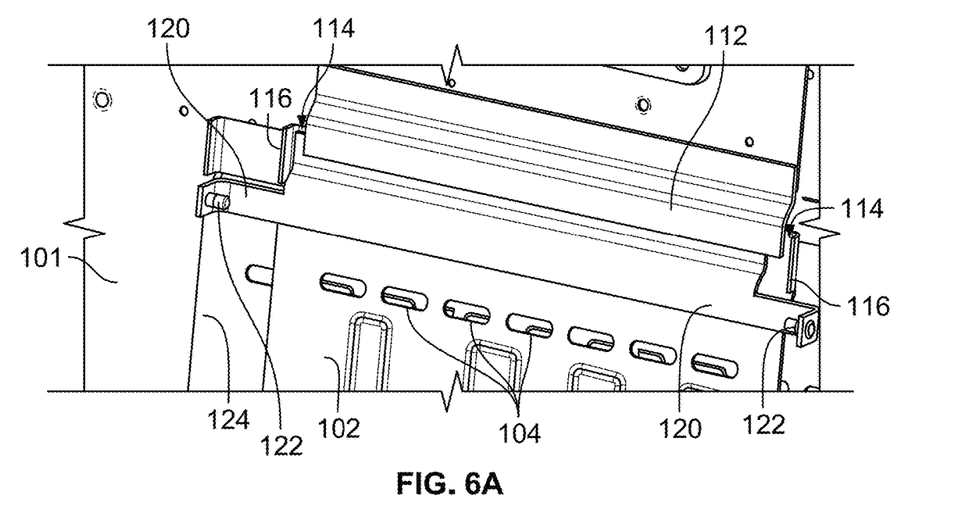
FIGS. 6A and 6B show an example arrangement for locking the device of FIGS. 1 and 2 to a support, in accordance with an example approach.
Figure 6B:
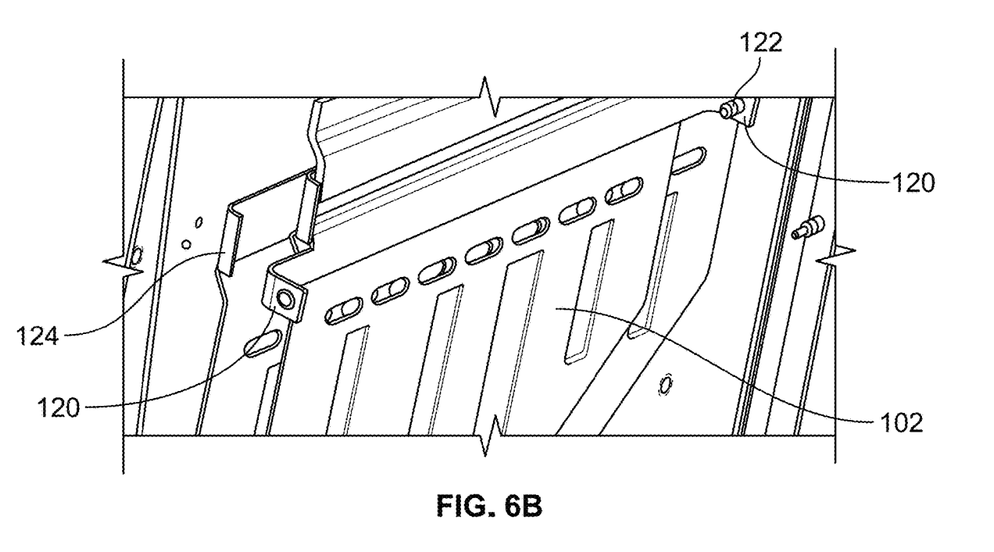

Turning now to FIGS. 6A and 6B, the device 101 is illustrated installed on the support 102. More specifically, the device 101 generally rests upon the load bearing feature 108, with device tab 112 inserted into the receiving space 114 of the blind guide 110. In some example approaches such as that illustrated in FIG. 6, one or more lock flanges 120 may be provided to facilitate locking the device 101 onto the support 102, thereby preventing removal of the device 101 from the support 102. For example, as shown in FIG. 6 two lock flanges 120 may each extend from the support 102 laterally or generally parallel to the mounting plane 106 (not shown in FIG. 6). The lock flange(s) 120 may have a curved end arranged perpendicular or substantially so with respect to the support 102 and/or mounting plane 106. One or more lock members 122 may extend through the lock flange 120 and a feature carried by the device 101, thereby preventing withdrawal of the device tab 112 from the receiving space 114, and in any case preventing removal of the device 101 from the support 102. In the example illustrated in FIGS. 6A and 6B, two lock members 122 are provided, with each extending through a respective end of the lock flange 120, and into a device flange 124 carried by the device 101. In the illustrated example, upon installation to the support 102, the device 101 may define a relatively small gap with respect to the wall surface (not shown in FIGS. 6A/6B) to which the support 102 is mounted, e.g., to permit access to insert lock member(s) 122 into the lock flange 120 and device flange 124. In an example, the gap is 20 millimeters (mm). In this example, the lock member(s) 122 are each M4 hex-head screws. A spacer (not shown) may be used to allow the device 101 to define a larger gap with respect to the wall surface. As a result of the securement of the lock flange 120 with the lock member(s) 122, movement of the device 101 upward with respect to the support 102 is prevented. Accordingly, the lock member(s) 122 may securely maintain the device on the support 102 after installation, and as a result the device 101 may resist becoming unsecured from the support 102 due to seismic events, impact loading, etc.

Figure 7:
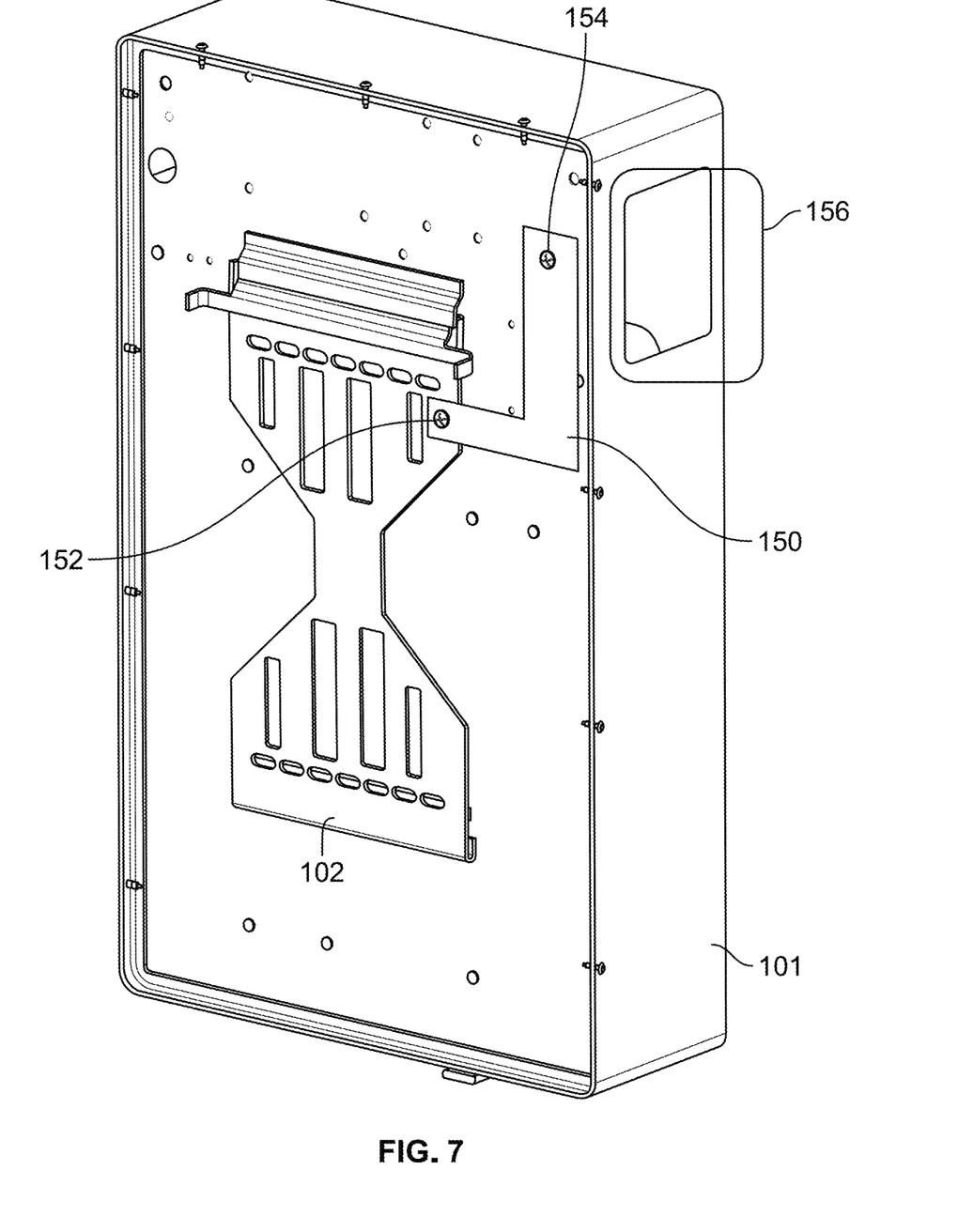
FIG. 7 shows another example arrangement for locking the device of FIGS. 1 and 2 to a support, in accordance with an example illustration.

Turning now to FIG. 7 another locking arrangement configured to secure the device 101 to the support 102 is illustrated. The arrangement may include a lock flange 150 that may be secured to the device 101 and to the support 102 after the device 101 is installed to the support 102. More specifically, the locking flange 150 may be a separate component, e.g., of stamped steel or the like, which is secured to the device 101. The locking flange 150 may be secured to the device with a first lock member 154. In an example, the lock member 154 is a threaded fastener, e.g., an M4 hex-head screw. Access to the area behind the device 101 to secure the locking flange 150 may be provided by way of an opening or access panel 156 in a side wall of the device 101. More specifically, with a cover (not shown) of the access panel 156 removed, a user may secure first lock member 154 to the device 101 and the locking flange 150. The locking flange may be similarly secured to the support 102, with a second lock member 152. For example, an M4 hex-head screw may be inserted through a corresponding aperture (not shown) of the locking flange 150 and into a back panel of the device 101.

Figure 8A:
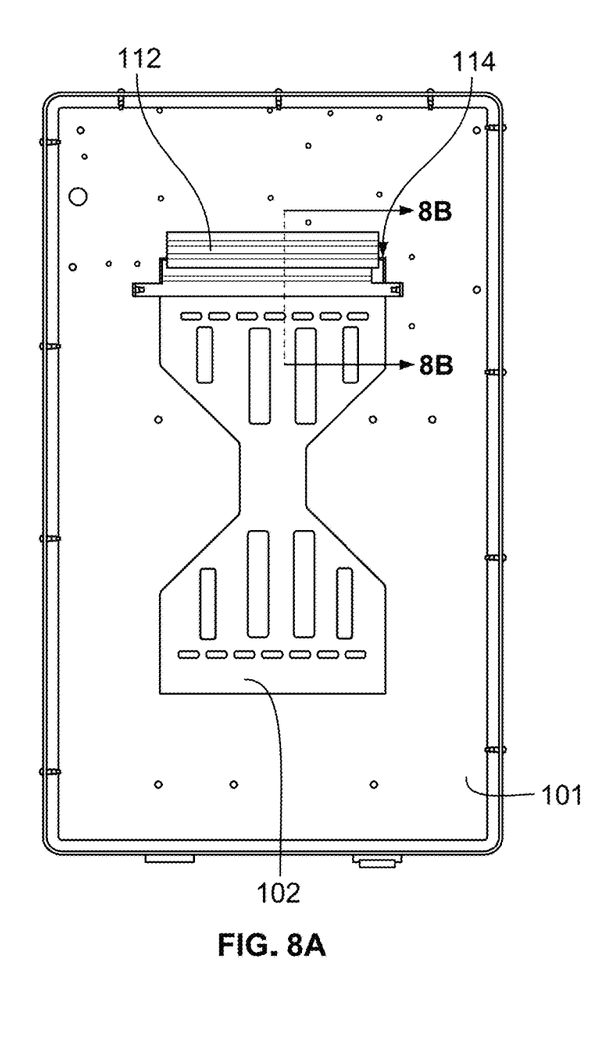
FIG. 8A shows a rear view of another example arrangement for locking the device of FIGS. 1 and 2 to a support, in accordance with another example approach.
Figure 8B:
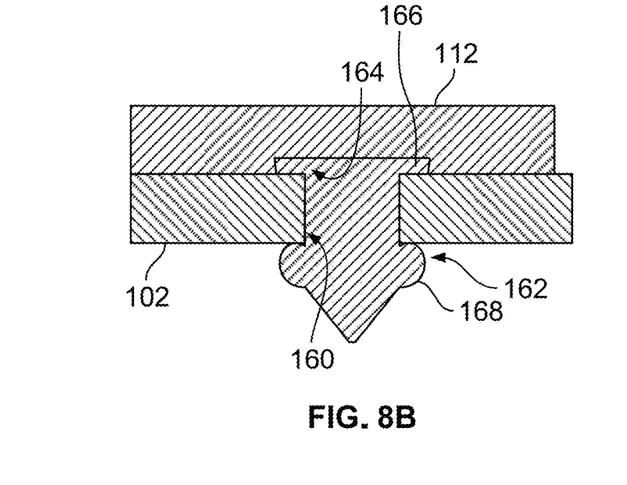
FIG. 8B shows a lock member inserted into a lock member aperture of the support of FIG. 8A.
Figure 8C:
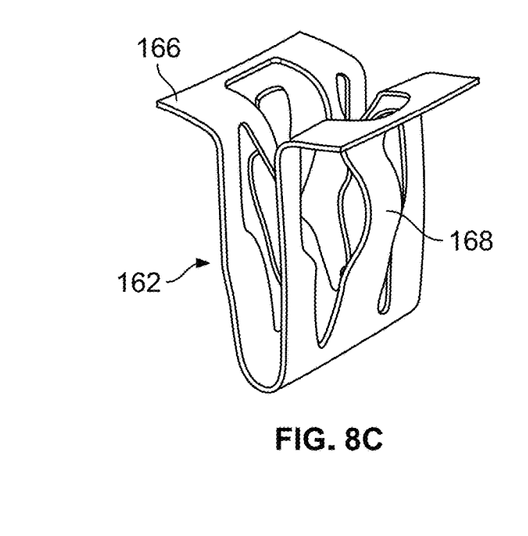
FIG. 8C shows an example lock member for the support of FIGS. 8B and 8C.

Turning now to FIGS. 8A-8C, another example arrangement for locking a device 101 to a support 102 is illustrated and described in further detail. As best seen in FIG. 8A, the device 101 is mounted/installed to the support 102, with the device tab 112 received in the receiving space 114 of the support 102. The support 102 may define a lock member aperture 160, as best seen in FIG. 8B. A lock member 162 may be inserted to extend through the aperture 160 to engage a detent 164 in the device tab 112, thereby preventing removal of the device 101 from the support 102. More specifically, with the lock member 162 engaged to detent 164 in the device tab 112, installation of device 101 may result in the weight/mass of the device 101 exerting an insertion force on the lock member 162. As a result, the lock member 162, being inserted to extend through the aperture 160, is retained in-place due to gravitational force of the device 101. If it is desired to remove the device 101 from the support 102, then a force will generally need to be exerted to lift the device tab 112 out of the support 102 to overcome the retention force of the lock member 162. As shown in FIGS. 8B and 8C, the lock member 162 may be a trim clip having a head portion 166 and a retention bulge 168. When the lock member/trim clip 162 is received in the aperture 160, the head portion 166 and retention bulge 168 are positioned on opposite sides of the support 102.

Figure 9:
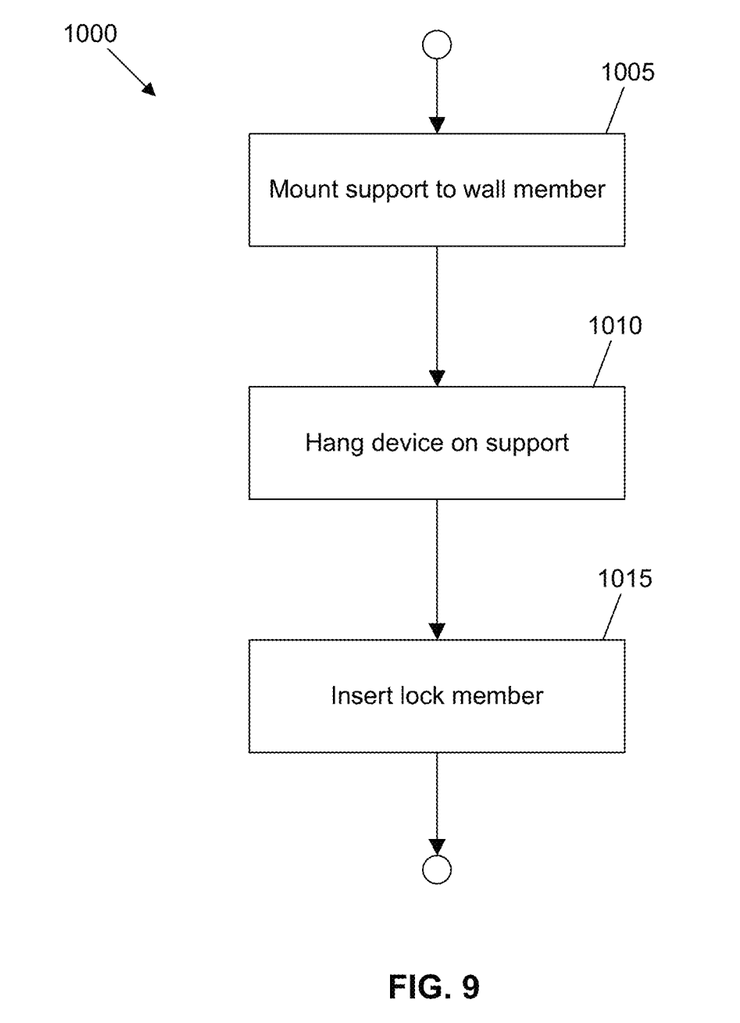
FIG. 9 shows a flowchart of an illustrative process for mounting a device, according to an example approach.

Turning now to FIG. 9, an example process 1000 for mounting a device, e.g., on a wall structure or wall member, is described in further detail. Process 1000 may begin at block 1005, where a support is mounted to a wall member or structure. For example, as noted above a support 102 may define a plurality of mounting apertures 104 extending in a mounting plane 106 that is parallel or substantially so with respect to the wall member. The support 102 may be secured, merely as examples, using screws or other threaded fasteners extending through the mounting apertures 104 and into a wall structure or member. To the extent the support 102 is configured to support relatively heavy objects such as device 101, fasteners securing the support 102 to the wall member(s) may be seated in wall structures, e.g., one or more studs. Further, the support may have a load bearing feature 108. Process 1000 may then proceed to block 1010.

At block 1010, a device may be hanged or otherwise supported on the support 102. As best seen in FIGS. 4 and 5, the device 101 may be positioned such that the device tab 112 is located directly above the receiving space 114 of the support 102, and moved vertically downward relative to the support 102 to insert the device tab 112 into the receiving space of the device 101. As noted above, the device tab 112 may be inserted into the receiving space 114 in a direction opposite that of the load bearing feature 108. In examples where the device 101 is relatively large, the support 102 may be concealed between the device 101 and wall structure/members to which the support 102 is secured. The device tab 112 may be wide relative to the device 101, thereby ensuring that an approximate locating of the device 101 will align the device tab 112 with respect to the receiving space 114. Accordingly, the blind guide may align the device tab 112 into the receiving space 114. In an example, the device tab 112 may define a width no less than half that of the device 101. As a result of the relatively wide extent of the device tab 112, is may be relatively easy to ensure that, to any extent the device tab 112 may initially be misaligned with respect to the support, such misalignment does not allow the device tab 112 to completely "miss" the support 102 as the device is lowered onto the support 102. A slight misalignment of the device tab 112 may result in the device tab 112 being brought into contact with either of the guide tabs 116 delimiting the lateral boundaries of the receiving space 114. Accordingly, the guide tabs 116 prevent insertion of the device tab 112 into the receiving space 114 unless the device tab 112 is aligned between the two guide tabs 116. The guide tabs 116 may be configured to allow the device 101 to be slid laterally with respect to the support 102, e.g., via a ramp, angled surface, friction-reducing coating, etc., and as a result the device tab 112 may be urged relative to the guide tab 116 in a lateral direction allowing the device tab 112 to "drop" into the receiving space 114. Further, at any time the device tab 112 is prevented from being inserted into the receiving space 114 by contact with a guide tab 116, the device 101 is spaced above the load bearing feature 108. As the device tab 112 is inserted into the receiving space 114, the device 101 may come to rest upon the load bearing feature 108. Process 1000 may then proceed to block 1015.

At block 1015, the device 101 may be prevented from being dislodged from the support 102 with one or more lock members. For example, as discussed above a lock member 122 may be inserted into a device flange(s) 124 and lock flange 120. The lock member 122 may be inserted in a direction generally parallel to the mounting plane 106 or within the mounting plane 106. Process 1000 may then terminate.

Accordingly, the load bearing feature 108 and blind guide 110 of the support 102 may generally facilitate installation of residential products "upright" to a wall structure, avoiding tilted or skewed installations. One or more lock members 122 of the apparatus may further secure residential products mounted on the support 102, e.g., to prevent a residential product from falling off the mounting apparatus during a seismic event, impact loading, etc. Further, to the extent the support 102 and load bearing feature 108 may be used to support a variety of different products, e.g., a residential battery, hub, and/or charger, the example apparatuses described herein may offer a standardized installation. Accordingly, example apparatuses and methods may reduce product costs and standardize installation across the various products.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A mounting apparatus for a device, comprising:
   a support comprising:
      a plurality of mounting apertures aligned on a mounting plane, wherein the support is configured to be mounted to a wall member such that the mounting plane is parallel and adjacent to the wall member;
      a load bearing feature extending away from the mounting plane to support the device; and
      a blind guide configured to guide a device tab extending downward into a receiving space defined by the blind guide, wherein the blind guide enables lateral movement of the device tab to a position directly above the receiving space.

2. The mounting apparatus of claim 1, wherein the load bearing feature is vertically spaced away from the blind guide when the support is mounted to the wall member.

3. The mounting apparatus of claim 1, wherein the load bearing feature is configured to provide vertical support to a first portion of the device and limit horizontal movement of the first portion of the device away from the wall member; and
   wherein the blind guide is positioned vertically above the load bearing feature and is arranged to limit horizontal movement of a second portion of the device away from the wall member.

4. The mounting apparatus of claim 1, wherein the load bearing feature extends in a bearing surface plane perpendicular to the mounting plane.

5. The mounting apparatus of claim 1, wherein the blind guide includes two guide tabs positioned at opposite ends of the receiving space.

6. The mounting apparatus of claim 5, wherein the receiving space is delimited at the opposite ends by the two guide tabs such that the guide tabs prevent insertion of the device tab into the receiving space unless the device tab is aligned between the two guide tabs.

7. The mounting apparatus of claim 5, further comprising a lock member received by the support, thereby preventing withdrawal of the device tab from the receiving space.

8. A bracket for mounting a device to a wall, comprising:
   a support structure arranged to:
      provide vertical support to a first portion of the device; and
      limit horizontal movement of the first portion of the device away from the wall; and
   a restraining structure positioned vertically above the support structure and arranged to limit horizontal movement of a second portion of the device away from the wall, wherein the restraining structure enables lateral movement of the second portion of the device to a position directly above a receiving space defined by the restraining structure.

9. The bracket of claim 8, wherein the restraining structure includes two guide tabs positioned at opposite ends of the receiving space for a downwardly extending device tab.

10. The bracket of claim 9, wherein the receiving space is delimited at the opposite ends by the two guide tabs such that the guide tabs prevent insertion of the device tab into the receiving space unless the device tab is aligned between the two guide tabs.

11. The bracket of claim 9, further comprising a lock member received by the support structure, thereby preventing withdrawal of the device tab from the receiving space.

12. The bracket of claim 8, wherein the restraining device is a blind guide configured to guide a device tab extending downward into the receiving space.

13. The bracket of claim 8, wherein the support structure includes a plurality of mounting apertures aligned on a mounting plane, wherein the support structure is configured to be mounted to a wall member such that the mounting plane is parallel and adjacent to the wall member.

14. The bracket of claim 8, wherein the support structure includes a load bearing surface configured to provide the vertical support to the first portion of the device and limit horizontal movement of the first portion of the device away from the wall.

15. A method of mounting a device, comprising:
mounting a support to a wall member with a plurality of mounting apertures aligned on a mounting plane such that the mounting plane is parallel and adjacent to the wall member; and
hanging the device on a load bearing feature of the support, the load bearing feature extending away from the mounting plane, wherein a blind guide of the support aligns a device tab extending downward into a receiving space defined by the blind guide, wherein the blind guide enables lateral movement of the device tab to a position directly above the receiving space.

16. The method of claim 15, wherein the receiving space is delimited at opposite ends by two guide tabs such that the guide tabs prevent insertion of the device tab into the receiving space unless the device tab is aligned between the two guide tabs.

17. The method of claim 15, further comprising inserting a lock member into the support, thereby preventing withdrawal of the device tab from the receiving space.

* * * * *